(12) United States Patent
McClure

(10) Patent No.: US 7,487,904 B2
(45) Date of Patent: Feb. 10, 2009

(54) REUSABLE POP-UP CONTAINER AND ASSOCIATED CONTAINER BLANK

(75) Inventor: Jack A McClure, Omaha, NE (US)

(73) Assignee: International Paper Co., Memphis, TN (US)

( * ) Notice: Subject to any disclaimer, the term of this patent is extended or adjusted under 35 U.S.C. 154(b) by 0 days.

(21) Appl. No.: 11/694,423

(22) Filed: Mar. 30, 2007

(65) Prior Publication Data

US 2008/0237318 A1 Oct. 2, 2008

(51) Int. Cl.
*B65D 5/36* (2006.01)
(52) U.S. Cl. .................. 229/117.05; 229/190; 229/920
(58) Field of Classification Search ............ 229/117.05, 229/117.06, 920, 190, 191, 117.16
See application file for complete search history.

(56) References Cited

U.S. PATENT DOCUMENTS

| | | | | |
|---|---|---|---|---|
| 715,026 | A * | 12/1902 | Crawford | 229/117.05 |
| 1,374,473 | A * | 4/1921 | Scotcher | 229/920 |
| 2,857,090 | A * | 10/1958 | Fallert | 229/190 |
| 3,193,176 | A * | 7/1965 | Gullickson | 229/117.06 |
| 4,711,390 | A * | 12/1987 | Andrews et al. | 229/117.06 |
| 5,062,527 | A * | 11/1991 | Westerman | 229/117.06 |
| 5,460,324 | A * | 10/1995 | Vinther | 229/117.05 |
| 6,837,420 | B2 * | 1/2005 | Westerman et al. | 229/117.05 |

* cited by examiner

*Primary Examiner*—Gary E Elkins

(57) ABSTRACT

The present invention includes a blank and container formed of cellulose-based materials configured to form a reusable and collapsible container. The container in the partially assembled, knock-down position lies substantially flat and is capable of being stacked and shipped. Arrival at a job site or at a time requiring the use of the container, the partially assembled knock-down container may be easily converted into a fully erect container ready for use as intended. Once loaded with product, the first and second top panels may be folded down to enclose the container. The container positions the relief scores primarily in the side panels with only a single relief score in the bottom panel. This configuration allows the bottom panel to distend while the container is in the collapsed state while not adversely affecting overall container strength.

5 Claims, 4 Drawing Sheets

REUSABLE POP-UP CONTAINER AND ASSOCIATED CONTAINER BLANK

FIELD OF THE INVENTION

This invention relates generally to blanks and the resulting containers and more specifically to reusable, and collapsible blanks and containers used in shipping products.

BRIEF DESCRIPTION OF THE DRAWINGS

Various embodiments of the present invention are described in detail below with reference to the following drawings. It is emphasized that, according to common practice, various features of the drawings are not to scale. On the contrary, the dimensions of the various features are arbitrarily expanded or reduced for clarity, including the drawings of the following figures.

DETAILED DESCRIPTION OF THE DRAWINGS

The present invention will now be described with reference to the accompanying drawings. The present invention is directed to a blank 20 and container 50 that utilize a plurality of side panel relief scores 35 and partial pre-assembly to impart ease of shipping a knock-down container that is quickly erectable and reusable. One suitable embodiment of the blank 20 and container 50, constructed in accordance with aspects of the present invention, is illustrated in FIGS. 1 through 4. Specific details of the blank 20 and the resulting container 50 are described in more particularity below.

Figure 1:
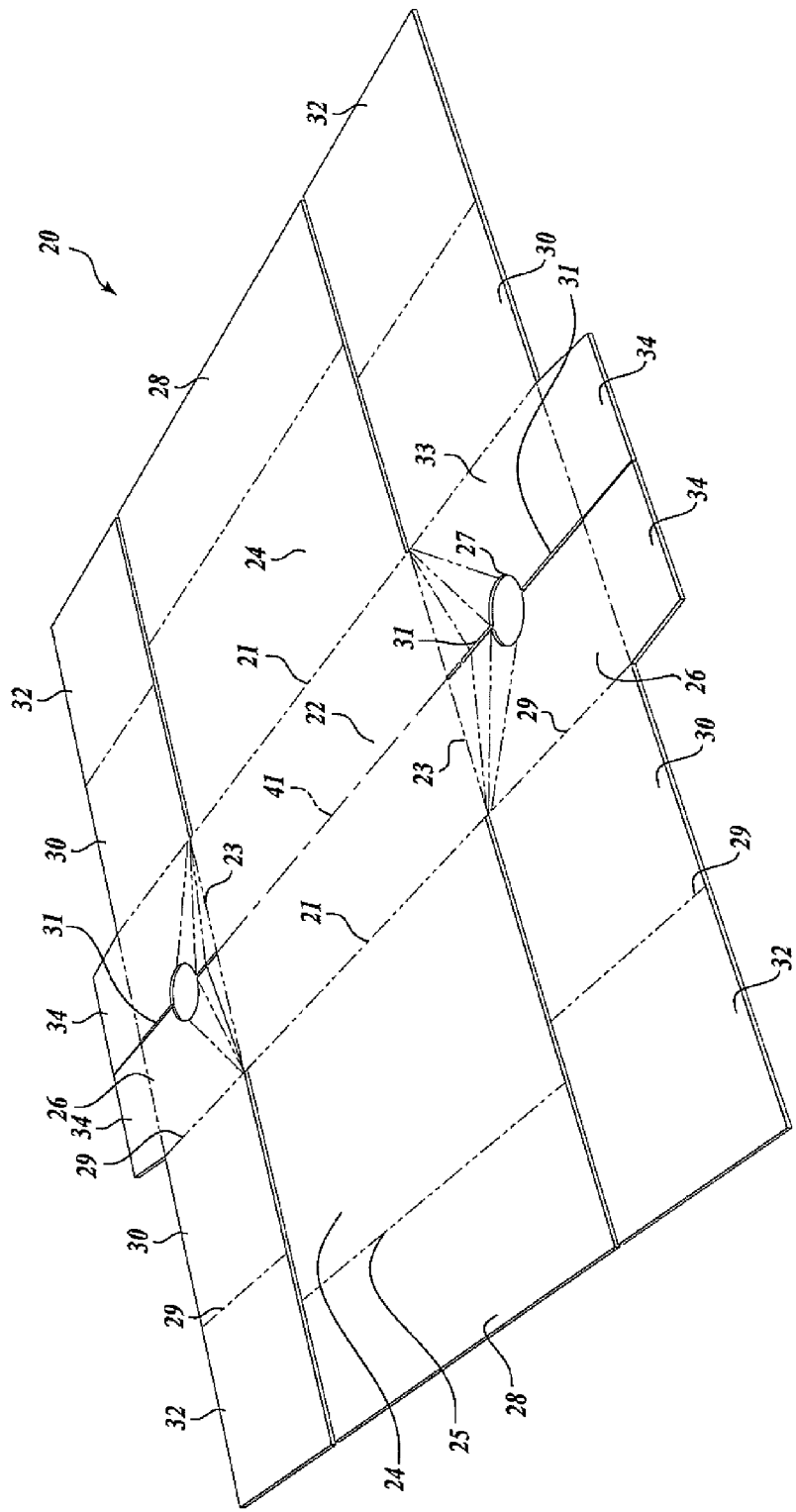
FIG. 1 is a perspective view of a single piece of container blank formed in accordance with the present invention.

FIG. 1 depicts a blank 20 used to form container 50. The blank 20 is typically constructed from a single piece of formable material such as, without limitation, sheets of cellulose-based materials formed from cellulose materials such as wood pulp, straw, cotton, bagasse or the like. Cellulose-based materials used in the present invention come in many forms, such as fiberboard, containerboard, corrugated containerboard and paperboard. The blank 20 is cut, scored, perforated or otherwise formed into a plurality of panels that, when assembled, form container 50. In all FIGURES, like numbers indicate like parts. Additionally, cut lines are shown as solid lines, score lines as dashed lines, and lines of perforation as broken lines. For the purposes of further description herein, the downward direction is defined as the direction perpendicular to the first bottom panel 22 that corresponds to the outer surface of the first bottom panel 22 when container 50 has been erected. The upward direction is defined as the direction perpendicular to the first bottom panel 22 that corresponds to the inner surface of the bottom panel 22 when container 50 has been erected.

With specific reference to FIG. 1, the blank 20 constructed according to an aspect of the present invention is disclosed. The blank 20 includes a includes a bottom panel 22 that is bounded by opposed fold lines 21 and opposed fold lines 23. Connected with the bottom panel 22 along fold lines 21 are first side panels 24. Connected with the bottom panel 22 along fold lines 23 are second side panels 26. Fold lines 21 and 23 are substantially perpendicular to one another. The bottom panel 22 also includes a lengthwise score line 41 that allows the bottom panel to be distended when the container 50 is in the collapsed state without unduly affecting the strength of the bottom panel 22 when the container 50 is in the erect state.

Attached to the first side panel 24 along a fold line 25, opposite the fold line 21, is a first top panel 28. Fold lines 21 and 25 are parallel to one another.

Formed in the second side panel 26 are a plurality of relief scores 35 radiating from a corner of the second side panel 26 at the respective intersection of fold lines 21 and 23. The fold lines radiate from a single point, but are at different angles relative to fold line 23. The relief scores 35 extend from the corner of the second side panel at the intersection of fold lines 21 and 23, to a substantially centrally located fold line 31. A cut-out 27 may also be positioned within the second side panel 26, and be in contact with at least one of the relief scores 35.

Connected with the second side panel 26, opposite said bottom panel 22, are top panels 34. Top panels 34 are connected with the second side panel 26 along fold lines 33. Fold line 33 is substantially parallel to fold line 23. Each second side panel 26 included two top panels 34 separated from one another by a cut line.

Additionally, the second side panel 26 is connected with a first corner panel 30 along a fold line 27. Fold line 27 is substantially perpendicular to, and intersects with, fold line 23.

Attached to the first corner panel 30, along a fold line 29, is a second corner panel 32. Fold line 29 is substantially parallel to fold line 27, and thus perpendicular to fold line 23.

Figure 2:
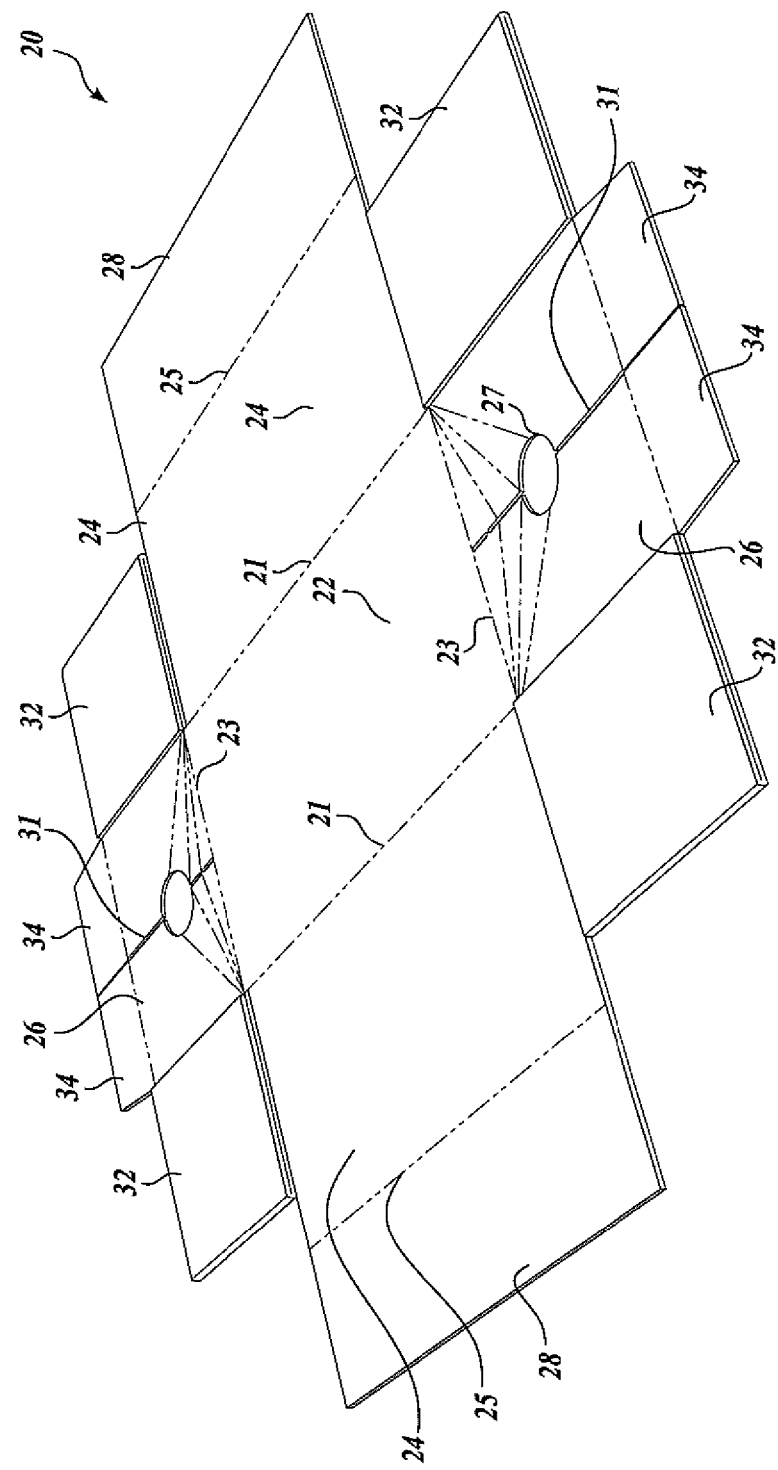
FIG. 2 is a perspective view of a partially assembled container formed according to an aspect of the present invention.
Figure 3:
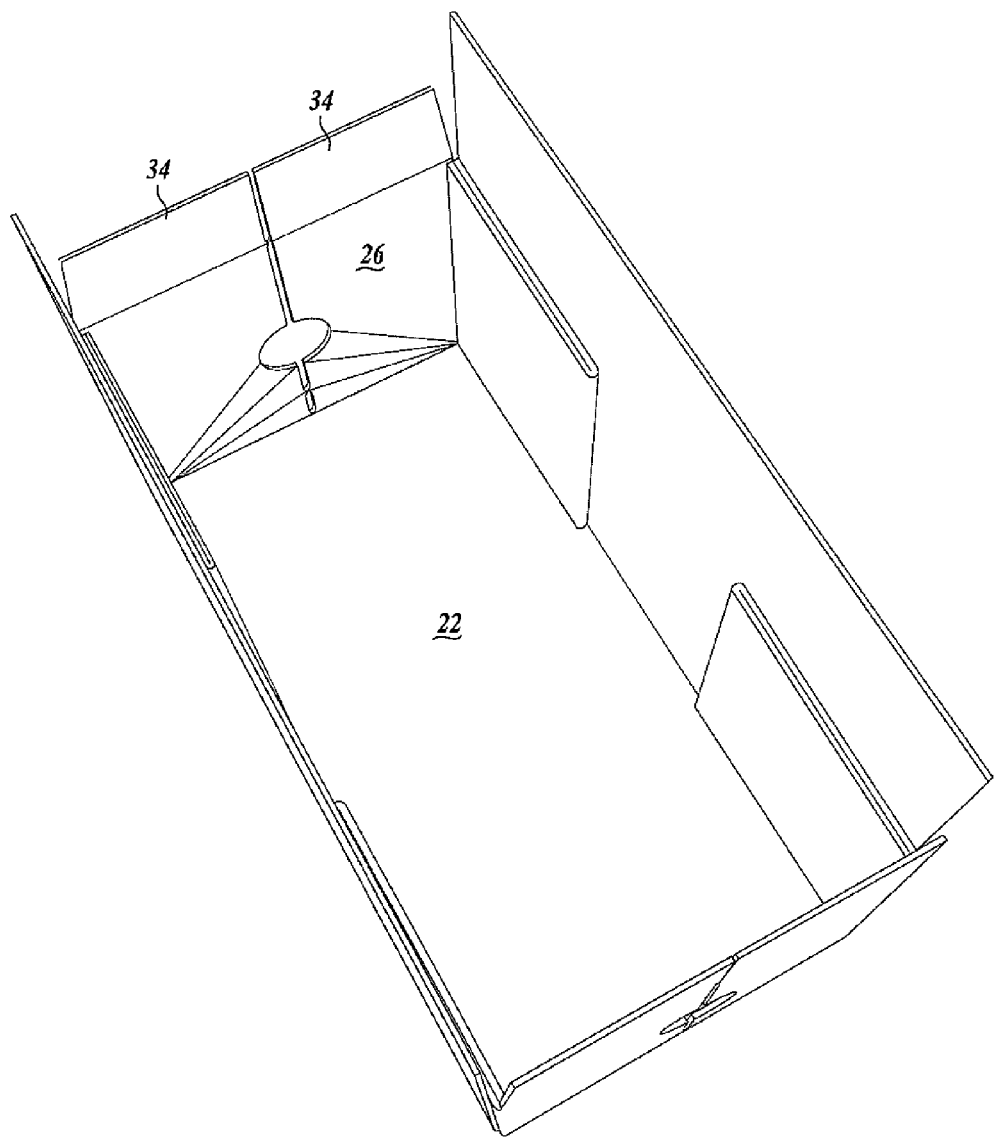
FIG. 3 is another perspective view of a partially assembled container manufactured in accordance with another aspect of the present invention; and, FIG. 4 is a perspective view of the partially assembled container in a collapsed or knock-down state.
Figure 4:
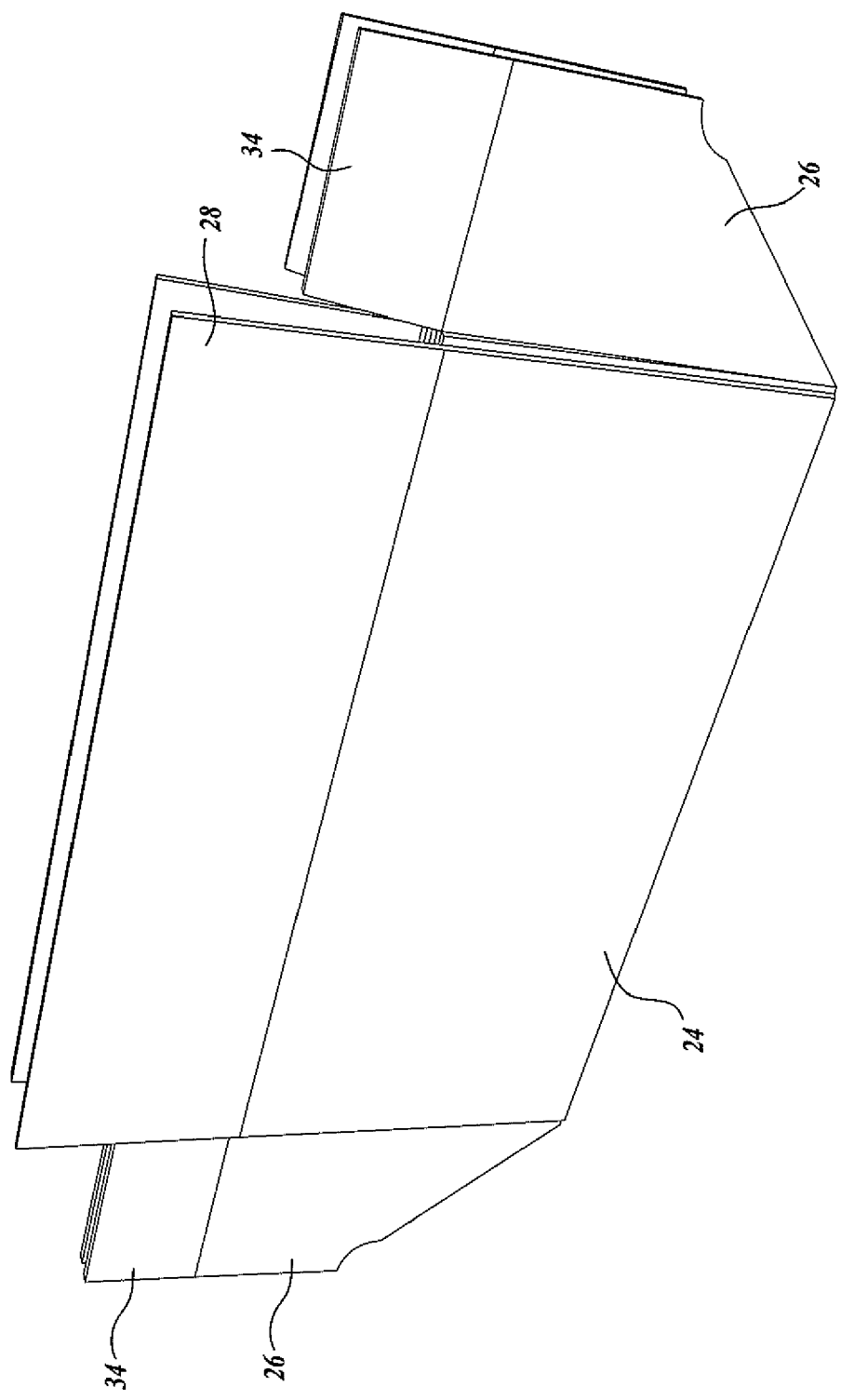

In FIGS. 2 through 4, general erection and use of this container is disclosed. Initially the second corner panel 32 may be folded over approximately 180 degrees around fold line 29, such that the second corner panel 32 is juxtaposed to the first corner panel 30. The first corner panel 30 and the second corner panel 32 may be joined together. Suitable non-limiting examples of methods of fastening or joining the respective corner first corner panel 30 to the second corner panel 32 include mechanical and chemical fasteners. Suitable non-limiting examples of chemical fasteners include adhesives, glues or tapes. Alternatively, suitable non-limiting examples of mechanical binders include staples, brads, tacks or various combinations of the same.

The joined first corner panel 30 and second corner panel 32 may be folded upwardly along a fold line 27 approximately 90 degrees. Subsequently the second side panel 26 may be folded upwardly along fold line 23 and the first side panel 24 may likewise be folded upwardly along fold line 21. This brings a portion of the first side panel 24 juxtaposed against the first corner panel 30. The first corner panel 30 may be joined to that portion of the first side panel 24 as described above. Subsequently the second top panels 34 may be folded inwardly along a fold line 33. The first top panels 28 may then be folded inwardly approximately 90 degrees along fold line 25 to bring a portion of the first top panel 28 adjacent juxtaposed against the second top panel 34. These respective top panels may also be attached as described above.

In reference to FIG. 3, a substantially completed container 50 is shown. The container 50 is ready to receive product (not shown) in this configuration. Subsequent to receiving product, the second top panels 34 and the first top panels 28 may be folded in as described above to close the container.

The multi-wall thicknesses found in the corner regions of the container 50 add a great deal of stacking strength. Additionally the multi-wall corner regions increase the stability of the container, during not only filling and unloading the container, but during the shipping.

With specific reference to FIG. 4, a partially assembled aspect of this container is shown. After the corner panel 30 and second corner panel 32 are joined together as described above, and are subsequently attached to the portion of the first side panel 24, the container 50 may be collapsed or knocked down for storage or shipping. This collapsed, partially assembled state allows shipping of high volumes of empty containers 50 to a job site and a user need only push in on the opposed ends to put the container 50 back into the fully erect state.

While various embodiments of this invention have been illustrated and described as noted above, many changes can be made without departing from the spirit and scope of the invention. Accordingly, the scope of the invention is not limited by the disclosure of the various embodiments. Instead, the invention should be determined entirely by reference to the claims that follow.

What is claimed is:

1. A single sheet of foldable material cut and scored to define a container, comprising:
   a bottom panel having a substantially centrally located score line;
   a first side panel connected with the bottom panel along a first fold line;
   a pair of opposed second side panels, connected with the bottom panel along a second fold line and a third fold line, the second fold line and the third fold line being substantially parallel to one another and separated by the bottom panel;
   a plurality of relief score lines formed in the each of the pair of opposed second side panels, the plurality of relief score lines radiating from a respective corner of the pair of opposed second side panels and running to substantially the center of the respective pair of opposed second side panels,
   wherein each of the plurality of relief score lines are at a different angle relative to the second fold line;
   a cut-out formed in each of the opposed second side panels, each of the cut-outs being in contact with the relief score lines and being spaced from the periphery of the respective second end panel;
   each of the second side panels having a pair of opposed side edges, each of the second side panel side edges having a first corner panel attached thereto, the attachment forming a first side edge of each first corner panel,
   each of the first corner panels having a second side edge opposite its first side edge, a second corner panel attached to each of the first corner panels along the second side edge,
   the entire bottom edge of each of the first and second corner panels being defined by a cut line and being adjacent the bottom panel in the formed container; and
   wherein each pair of first and second corner panels being juxtaposed.

2. The container of claim 1, wherein the single sheet of foldable material is formed from a cellulose-based material.

3. The container of claim 1, wherein the cellulose based material is formed from at least one of a wood pulp, straw, cotton, and bagasse.

4. The container of claim 1, wherein the cellulose based material is in the form of at least one of a fiberboard, containerboard, corrugated containerboard and paperboard.

5. A blank for a container comprising:
   a single sheet of foldable material cut and scored to define a bottom panel;
   a pair of opposed first side panels connected with the bottom panel along a pair of first fold lines, the pair of first fold lines being substantially parallel and separated by the bottom panel;
   a pair of opposed second side panels, connected with the bottom panel along a second fold line and a third fold line, the second fold line and the third fold line being substantially parallel to one another and separated by the bottom panel;
   a substantially centrally located score line extending through the bottom panel and opposed second side panels;
   a plurality of relief score lines formed in the each of the pair of opposed second side panels, the plurality of relief score lines radiating from a respective corner of the pair of opposed second side panels and running to substantially the center of the respective pair of opposed second side panels,
   wherein each of the plurality of relief score lines are at a different angle relative to the second fold line;
   a cut-out formed in each of the opposed second side panels, each of the cut-outs being in contact with the relief score lines and being spaced from the periphery of the respective second end panel;
   each of the second side panels having a pair of opposed side edges, each of the second side panel side edges having a first corner panel attached thereto, the attachment forming a first side edge of each first corner panel;
   each of the first corner panels having a second side edge opposite its side edge, a second corner panel attached to each of the first corner panels along the second side edge; and
   the bottom edge of each of the first and second corner panels being defined by a cut line between the corner panels and the first side panels.

* * * * *